April 10, 1962 K. M. BAXT 3,029,307

COMMUNICATION APPARATUS

Filed May 21, 1959

INVENTOR.
KENNETH M. BAXT
BY Arthur H. Seidel
ATTORNEY 3,029,307

COMMUNICATION APPARATUS

Kenneth M. Baxt, 180 Madison Ave., New York, N.Y.

Filed May 21, 1959, Ser. No. 814,730
7 Claims. (Cl. 179—1)

Figure 1:
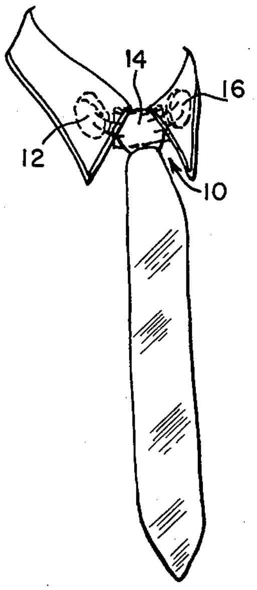

This invention relates to electronic communication apparatus and particularly, to voice-amplifying equipment which is portable, is of small size and concealable, and embodies a microphone, amplifying means, and a loud speaker.

Members of society are constantly faced with the problem of trying to communicate with each other in places where a high ambient noise level exists. Under such conditions, it is practically impossible to carry on conversation. At the present time, there is no completely suitable apparatus useful for solving this problem.

The principles and objects of the present invention are directed to the provision of improved portable speech-amplifying apparatus which is of such small size that it may be substantially concealed by the user and which includes, in a small package, a microphone, amplifying means, and a loud speaker.

Briefly, the apparatus of the invention includes a microphone which is known as a throat microphone and is adapted to receive vibrations at the surface of the skin in the region of the throat and to produce electrical currents therefrom. The microphone is coupled through transistor amplifier stages and through a push-pull transistor amplifier stage to a small speaker which is also of such size that it may be concealed on the person of the user.

Figure 2:
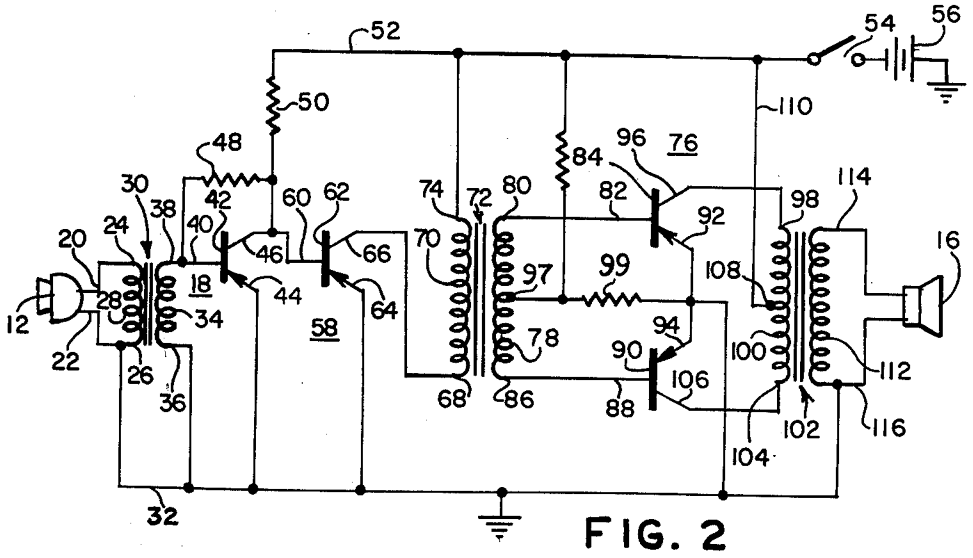

The invention is described in greater detail by reference to the drawing wherein:

FIGURE 1 is a perspective schematic view of apparatus embodying the invention as worn by a user; and FIGURE 2 is a schematic representation of a circuit embodying the invention.

Referring to FIGURE 1, voice-amplifying apparatus 10 embodying the invention is shown in one arrangement as it may be worn by a user. The apparatus includes a miniature microphone 12 of the type known as a throat microphone which is adapted to detect vibrations when in contact with the surface of the skin in the region of the throat of the user. From the detected vibrations, the microphone generates electrical currents. The microphone may be concealed by the collar of the wearer, or by a scarf, or the like. The microphone is coupled to a miniaturized transistor amplifier package 14 which, in turn, is coupled to a miniature speaker 16. Both the amplifier package 14 and the speaker 16 may also be readily concealed on the person of the user.

Referring to the circuit shown in FIGURE 2, the microphone 12 is coupled to a first stage transistor amplifier 18, by leads 20 and 22 therefrom which are connected to the ends 24 and 26 of the primary winding 28 of a coupling transformer 30. The end 26 of the primary winding is coupled to a buss 32 which is connected to a source of reference potential, such as ground. The transformer 30 includes a secondary winding 34 which has one end 36 connected to the buss and the other end 38 connected to the base electrode 40 of a first transistor 42, for example, a PNP transistor. The transistor 42 includes an emitter electrode 44 which is connected to the buss 32 and a collector electrode 46 which is connected through a suitable biasing resistor 48 to the base electrode 40. The collector electrode 46 of the first transistor 42 is also connected through a load resistor 50 to a buss 52. The buss, in turn, is connected through a suitable switch means 54 to the negative terminal of a power source, for example, a battery 56, the positive terminal of which is connected to ground.

The first transistor stage 18 is coupled to a second transistor amplifier stage 58 by means of the collector electrode 46 which is connected to the base electrode 60 of a second transistor 62, for example, a PNP transistor which may be of the same type as the first transistor 42. The emitter electrode 64 of the second transistor is connected to the buss 32, and the collector electrode 66 of the transistor 62 is connected to one end 68 of the primary winding 70 of a coupling transformer 72, the other end 74 of which is connected to the buss 52. The transformer 72 couples the second transistor amplifier stage 58 to a push-pull transistor amplifier stage 76 and includes a secondary winding 78, one end 80 of which is connected to the base electrode 82 of a first PNP transistor 84, and the other end 86 of which is connected to the base electrode 88 of a second PNP transistor 90. The first and second transistors 84 and 90 include emitter electrodes 92 and 94 which are connected together and through a common resistor 99 to a center tap 97 on the secondary winding 78 of the transformer 72. The transistor 84 includes a collector electrode 96 which is coupled to one end 98 of the primary winding 100 of an output transformer 102, the other end 104 of which is connected to the collector electrode 106 of the second transistor 90.

The primary winding 100 of the transformer 102 is provided with a center tap 108 which is connected through a lead 110 to the buss 52. The transformer 102 includes a secondary winding 112 having two leads 114 and 116 from its ends which are connected to the small speaker 16. The lead 116 from the secondary winding 112 is also connected to the buss 32.

In operation of the voice-amplifying apparatus of the invention, vibrations emanating from the larynx of the user are detected by the microphone 12 at the surface of the skin and the resulting electrical signals are amplified in the two transistor stages 18 and 58 including the transistors 42 and 62. The signals appearing at the output of the second stage are coupled into the push-pull amplifier stage 76 where they are further amplified and transmitted to the speaker 16 from which they emanate as audible signals. These audible signals easily overcome ambient noise with the expenditure of little power in the amplifier package.

In one circuit constructed according to the invention, the following circuit components were employed:

| | |
|---|---|
| Resistor | 100 ohms. |
| Do | 15,000 ohms. |
| Do | 43,000 ohms. |
| Do | 1 megohm. |
| Transformer | 50,000 ohms primary to 1500 ohms secondary. |
| Do | 20,000 ohms primary to 2000 ohms center tap secondary. |
| Do | 4,000 ohms center tap primary to 3.2 ohms secondary. |
| Transistors | General Electric 2N107. |

The present invention may be embodied in other specific forms without departing from the spirit or essential attributes thereof and, accordingly, reference should be made to the appended claims, rather than to the foregoing specification as indicating the scope of the invention.

What is claimed is:

1. Electronic voice-amplifying apparatus including a throat-operated microphone, a transistor amplifier package coupled to said microphone, and a speaker coupled to said amplifier package, said foregoing elements being coupled together in a miniature package for placement on the human body in the vicinity of the throat where it might be concealed by an article of clothing, said microphone thus being accessible to voice vibrations of the user and said speaker being in position to transmit audible sound to a recipient in the immediate vicinity thereof.

2. Electronic voice-amplifying apparatus including a miniature concealable throat-operated microphone, a multi-stage transistor amplifier package coupled to said microphone, and a miniature concealable speaker coupled to said amplifier package, said foregoing elements being coupled together in a miniature package for placement on the human body in the vicinity of the throat where it might be concealed by an article of clothing, said microphone thus being accessible to voice vibrations of the user and said speaker being in position to transmit audible sound to a recipient in the immediate vicinity thereof.

3. Electronic voice-amplifying apparatus including a miniature throat-operated microphone, a multi-stage transistor amplifier package coupled to said microphone, said amplifier package including a plurality of cascaded transistor amplifier stages and a push-pull transistor amplifier stage, and a miniature speaker coupled to said amplifier package, said foregoing elements being coupled together in a miniature package for placement on the human body in the vicinity of the throat where it might be concealed by an article of clothing, said microphone thus being accessible to voice vibrations of the user and said speaker being in position to transmit audible sound to a recipient in the immmediate vicinity thereof.

4. Electronic voice-amplifying apparatus including a miniature throat-operated microphone, a multi-stage transistor amplifier package, said amplifier package including two stages of transistor amplification and a push-pull stage of transistor amplification, and a speaker coupled to the output of said push-pull stage, said foregoing elements being coupled together in a miniature package for placement on the human body in the vicinity of the throat where it might be concealed by an article of clothing, said microphone thus being accessible to voice vibrations of the user and said speaker being in position to transmit audible sound to a recipient in the immediate vicinity thereof.

5. Electronic voice-amplifying apparatus including a miniature throat-operated microphone, a coupling transformer coupling said microphone to a first transistor amplifier, said first transistor being directly coupled to a second transistor amplifier, a second coupling transformer coupling said second transistor to a push-pull transistor amplifier stage, and a speaker coupled to the output of said push-pull amplifier stage, said foregoing elements being coupled together in a miniature package for placement on the human body in the vicinity of the throat where it might be concealed by an article of clothing, said microphone thus being accessible to voice vibrations of the user and said speaker being in position to transmit audible sound to a recipient in the immediate vicinity thereof.

6. Electronic voice-amplifying apparatus including a throat-operated microphone, a first PNP transistor including base, emitter, and collector electrodes, said microphone being coupled to the base electrode of said first transistor, the emitter of said first transistor being connected to a source of reference potential, the collector electrode of said first transistor being coupled to a source of biasing voltage, a second transistor having base, emitter, and collector electrodes, the collector electrode of said first transistor being connected to the base electrode of said second transistor, the emitter of said second transistor being connected to said source of reference potential and and the collector electrode of said second transistor being connected both to said source of biasing voltage and to the input of a push-pull transistor amplifier, and a loud speaker coupled to the output of said push-pull amplifier, said foregoing elements being coupled together in a miniature package for placement on the human body in the vicinity of the throat where it might be concealed by an article of clothing, said microphone thus being accessible to voice vibrations of the user and said speaker being in position to transmit audible sound to a recipient in the immediate vicinity thereof.

7. The apparatus defined in claim 6 wherein said push-pull amplifier includes two transistors having their base and emitter electrodes coupled together and their collector electrodes connected to a coupling transformer which is coupled to said speaker.

References Cited in the file of this patent

UNITED STATES PATENTS

| | | |
|---|---|---|
| 2,374,090 | French | Apr. 17, 1945 |
| 2,385,867 | Kuhlick | Oct. 2, 1945 |

FOREIGN PATENTS

| | | |
|---|---|---|
| 445,537 | Italy | Feb. 18, 1949 |
| 207,875 | Australia | May 9, 1957 |